US012618615B2

(12) United States Patent
Thomas et al.

(10) Patent No.: US 12,618,615 B2
(45) **Date of Patent: *May 5, 2026**

(54) LED LIGHTING ARRAY SYSTEM FOR ILLUMINATING A DISPLAY CASE

(71) Applicant: ElectraLED, Inc., Clearwater, FL (US)

(72) Inventors: James Thomas, Clearwater, FL (US); Vladimir Volochine, Clearwater, FL (US)

(73) Assignee: ElectraLED, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,569

(22) Filed: Mar. 17, 2023

(65) Prior Publication Data

US 2023/0213271 A1 Jul. 6, 2023

Related U.S. Application Data

(63) Continuation of application No. 17/340,210, filed on Jun. 7, 2021, now Pat. No. 11,609,039, which is a (Continued)

(51) Int. Cl.

*F25D 27/00* (2006.01)
*A47F 3/00* (2006.01)
(Continued)

(52) U.S. Cl.

CPC .............. *F25D 27/00* (2013.01); *A47F 3/001* (2013.01); *A47F 3/04* (2013.01); *A47F 11/10* (2013.01);
(Continued)

(58) Field of Classification Search

CPC ........ F25D 27/00; F25D 27/005; A47F 3/001; A47F 3/04; A47F 11/10; A47F 3/0482;
(Continued)

(56) References Cited

U.S. PATENT DOCUMENTS 7,559,672 B1 * 7/2009 Parkyn ...................... A47F 3/04 362/127
8,142,038 B2 * 3/2012 Li ........................... F25D 27/00 362/125
(Continued)

FOREIGN PATENT DOCUMENTS

WO WO-2014042318 A1 * 3/2014 ................ F21V 5/04

*Primary Examiner* — Alexander K Garlen
(74) *Attorney, Agent, or Firm* — Barnes & Thornburg LLP

(57) ABSTRACT

An LED lighting array system includes discrete lighting modules spatially arrayed along a support member to provide illumination of items within a display case. The modules have a low overall height that results in them being mounted in a low-profile configuration at various locations along the support member. The modules include a housing with opposed first and second sets of side apertures, a plurality of internal reflecting surfaces associated with the apertures, respectively, an external lens, a multi-sided light engine and a group of side-emitting LEDs. During operation, a first portion of light generated by the side-emitting LEDs is discharged through apertures and the lens into the cooler to illuminate contents therein, while a second portion of light generated by the side-emitting LEDs is redirected by the reflecting surface through said apertures and the lens into the cooler.

20 Claims, 6 Drawing Sheets

Related U.S. Application Data continuation of application No. 16/201,570, filed on Nov. 27, 2018, now Pat. No. 11,029,084, which is a continuation of application No. 15/645,747, filed on Jul. 10, 2017, now Pat. No. 10,139,156, which is a continuation of application No. 14/927,945, filed on Oct. 30, 2015, now Pat. No. 9,702,618.

(60) Provisional application No. 62/072,770, filed on Oct. 30, 2014.

(51) Int. Cl.

| | |
|---|---|
| ***A47F 3/04*** | (2006.01) |
| ***A47F 11/10*** | (2006.01) |
| ***F21V 33/00*** | (2006.01) |
| ***F21Y 115/10*** | (2016.01) |

(52) U.S. Cl.

CPC ........ *F21V 33/0024* (2013.01); *A47F 3/0482* (2013.01); *F21Y 2115/10* (2016.08)

(58) Field of Classification Search

CPC .. F21V 33/0024; F21V 5/007; F21Y 2115/10; F21Y 2103/10; F21S 4/20; F21S 4/22; F21S 4/24; F21S 4/28

See application file for complete search history.

(56) References Cited

U.S. PATENT DOCUMENTS

| | | | | | |
|---|---|---|---|---|---|
| 9,410,734 | B2 * | 8/2016 | Shin | F25D 23/00 | |
| 11,029,084 | B2 * | 6/2021 | Thomas | A47F 3/001 | |
| 11,609,039 | B2 * | 3/2023 | Thomas | A47F 11/10 | |
| 2005/0265019 | A1 * | 12/2005 | Sommers | F21S 4/20 | 362/217.16 |
| 2006/0077653 | A1 * | 4/2006 | Nowak | F21V 17/164 | 362/133 |
| 2008/0007945 | A1 * | 1/2008 | Kelly | F25D 21/04 | 362/218 |
| 2008/0037239 | A1 * | 2/2008 | Thomas | F21V 29/83 | 362/217.05 |
| 2008/0186696 | A1 * | 8/2008 | Awai | G02B 6/001 | 362/92 |
| 2011/0051401 | A1 * | 3/2011 | Bauer | F21S 4/28 | 362/125 |
| 2011/0096533 | A1 * | 4/2011 | Sekela | F21V 7/0091 | 362/225 |
| 2011/0096551 | A1 * | 4/2011 | Sekela | A47F 3/001 | 362/296.01 |
| 2011/0310598 | A1 * | 12/2011 | Swafford, Jr. | A47F 3/001 | 362/217.02 |
| 2012/0106129 | A1 * | 5/2012 | Glovatsky | F25D 23/067 | 362/92 |
| 2012/0300441 | A1 * | 11/2012 | Thomas | F21V 29/76 | 362/225 |
| 2013/0188356 | A1 * | 7/2013 | Breslow | F21V 7/00 | 29/832 |
| 2013/0301256 | A1 * | 11/2013 | Thomas | F21V 19/001 | 362/224 |
| 2015/0070879 | A1 * | 3/2015 | Bilinski | A47F 11/10 | 362/125 |
| 2015/0241020 | A1 * | 8/2015 | Lee | F21V 7/00 | 362/257 |

* cited by examiner

LED LIGHTING ARRAY SYSTEM FOR ILLUMINATING A DISPLAY CASE

CROSS-REFERENCE TO RELATED APPLICATION

This application is a continuation of U.S. patent application Ser. No. 17/340,210, which is a continuation of U.S. Pat. No. 11,029,084, which is a continuation of U.S. Pat. No. 10,139,156, which is a continuation of U.S. Pat. No. 9,702,618, which claims the benefit of U.S. Provisional Patent Application No. 62/072,770, all of which are incorporated in their entirety herein by reference.

TECHNICAL FIELD

The invention provides an LED lighting array system comprising discrete lighting modules that are spatially arrayed along a support member to provide illumination of items within a display case.

BACKGROUND

Many different types of conventional light fixtures are used to illuminate refrigerated display cases or coolers that house food and beverages, typically in grocery stores and convenience stores. These light fixtures use different types of light sources ranging from incandescent to halogen to light emitting diodes (LEDs). However, the light from these conventional fixtures is generally poorly controlled, which reduces the operating efficiency of the fixture and the cooler. Poorly controlled light falls outside the target area to be illuminated and/or does not properly illuminate that area, which degrades the appearance of the contents of the cooler (e.g. food or beverage products within the cooler). Also, poorly controlled light, even from low wattage sources such as LEDs, can cause glare to consumers standing or walking outside the cooler. In addition to ineffective illumination of the target area, poorly controlled light reduces the operating efficiency of the conventional fixture and the cooler which results in higher operating costs and increased wear on electrical components. This wasted light not only consumes excess energy, but distracts from the visual appearance of the target by illuminating areas outside of the target boundaries.

Moreover, conventional LED fixtures for use within refrigerated cases and coolers typically feature a large, elongated housing and an elongated light engine that includes a significant quantity of LEDs populating an elongated Printed Circuit Board (PCB). As a result, these conventional LED fixtures have large dimensions and accordingly only a small number of these fixtures may be installed within a cooler to illuminate the contents therein. Due to their large dimensions and space requirements, conventional LED fixtures have limited design applications and their configurations cannot be easily adjusted or tailored to meet the installation and performance requirements of different coolers, including coolers having different interior dimensions and configurations as well as different operating conditions.

Accordingly, there is a need for an LED lighting system fixture that precisely controls the generation and direction of the emitted light to efficiently illuminate a desired target area and minimizes illumination of areas surrounding the target area, and thereby improves the operating performance and efficiency of the system and cooler. There is also a need for an LED lighting system comprising multiple lighting modules that can be arrayed and installed within a cooler support member, thereby enabling the LED lighting system to be tailored to meet the installation and performance requirements of different coolers and different support members.

SUMMARY OF THE DISCLOSURE

Disclosed herein is an innovative LED lighting array system comprising discrete lighting modules that are spatially arranged along a support member to provide illumination of items within a display case, such as a refrigerated display cooler (or case or freezer) for food and/or beverages. The modules may have a low overall height that results in them being mounted in a low-profile configuration at various locations along the support member. The modules may include a housing having a first set of side apertures and a second set of side apertures, wherein the first and second sets of side apertures are configured in an opposed spatial relationship. The housing also may have a plurality of internal reflecting surfaces extending inward from a peripheral wall of the housing and associated with the apertures. An external lens may be configured to substantially mate with an upper extent of the housing when the module is in the assembled position. A multi-sided light engine may be positioned within the housing and may include a group of side-emitting LEDs associated with each of the side apertures.

During operation of the LED lighting array system, a first portion of light generated by the side-emitting LEDs is discharged through the apertures and the lens into the cooler to illuminate products therein. A second portion of light generated by the side-emitting LEDs is redirected by the reflecting surface through said apertures and the lens into the cooler. In this manner, the inventive LED lighting system fixture may precisely control the generation and direction of the emitted light to efficiently illuminate a desired target area within the cooler, and thereby improve the operating performance and efficiency of the system and cooler.

Additional features, advantages, and embodiments of the present disclosure may be set forth or apparent from consideration of the following attached detailed description and drawings. Moreover, it is to be understood that both the foregoing summary of the present disclosure and the following detailed description of figures are exemplary and intended to provide further explanation without limiting the scope of the present disclosure as claimed.

BRIEF DESCRIPTION OF THE DRAWINGS

To understand the present disclosure, it will now be described by way of example, with reference to the accompanying drawings in which.

Figure 1:
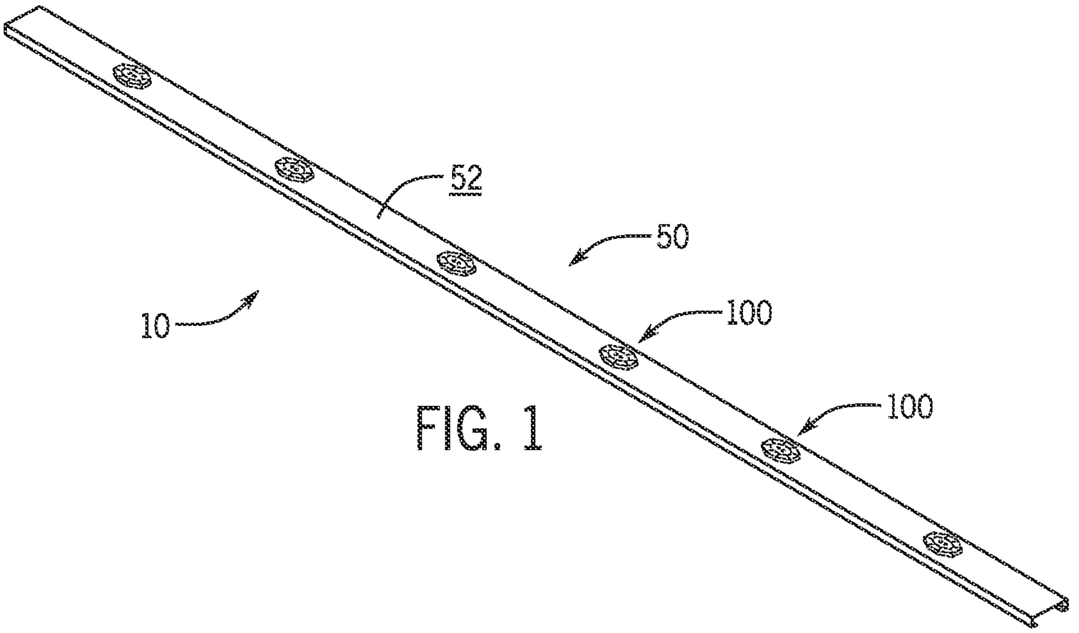
FIG. 1 is a perspective view of one or more embodiments of an LED lighting array system including six discrete LED lighting modules electrically connected and mounted to a support structure.

These drawings illustrate embodiments of the present disclosure and together with the detailed description serve to explain the principles of the disclosure. No attempt is made to show structural details of the present disclosure in more detail than may be necessary for a fundamental understanding of the disclosure and the various ways in which it may be practiced.

DETAILED DESCRIPTION

Exemplary embodiments of the present disclosure and the various features and advantageous details thereof are explained more fully with reference to the non-limiting embodiments and examples that are described and/or illustrated in the accompanying drawings and detailed in the following attached description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skills in the art to practice the embodiments of the present disclosure. Accordingly, the examples and embodiments herein should not be construed as limiting the scope of the present disclosure, which is defined solely by the appended claims and applicable law. Moreover, it is noted that like reference numerals represent similar parts throughout the several views of the drawings.

FIGS. 1-9 show an exemplary embodiment of an LED lighting array system 10 comprising discrete lighting modules 100 that are spatially arrayed along a support member 50 to provide illumination of items within a display case, such as a refrigerated display cooler (or case or freezer) for food and/or beverages. The support member 50 can be an integral part of the cooler's support frame, or a frame member of the cooler's door assembly. Depending on the size and configuration of the display cooler, multiple LED lighting array systems 10 may be installed within the cooler. An exemplary cooler has two corner (or end) frame members and a door assembly that includes a pair of doors separated by a central frame member, wherein each of these support members may include the LED lighting array system 10.

The system 10 is designed to provide modular flexibility with respect to the system's operating performance, including light output and energy consumption, such that the specific number of modules 100 installed within a support member 50 may be determined by an operator of the cooler. In this manner, the support member 50 may be configured with an appropriate number of modules 100. The number of modules 100 to install may be obtained by dividing the total required luminous flux by the luminosity of a single module 100. As shown in FIG. 1, the discrete modules 100 may be separated along the support member 50 by an appreciable distance that may be a function of total required luminous flux, cooler dimensions and configuration, and support member 50 dimensions and configuration. Rather than having to punch or cut a number of holes in the inner walls and/or frame of the cooler, the system 10 may be installed by merely affixing the support member 50 within the cooler to illuminate a desired target area. In this manner the system 10, including the support member 50 and the modules 100, may be installed as either original equipment or retrofitted to an existing cooler.

The modules 100 within a particular support member 50 may be electrically connected in a daisy-chain manner with common leads to a power supply (not shown) that may be installed within the support member 50. Interconnection between individual modules 100 may be accomplished by crimping or soldering two lines of continuous leads (or wires) to connectors or solder pads affixed to a printed circuit board (PCB) within the module 100. One end of each lead may be connected to the power supply, which in one embodiment is a constant voltage, 24 Volt power supply. The maximum number of modules 100 that can be used in a configuration of the system 10 may be determined by dividing the maximum power provided by the power supply by the power consumed by a single module 100 during operation. As the system 10 is modular, a specific module 100 may be easily removed from the support member 50 and replaced or serviced.

Referring to the Figures, the LED module 100 may include an external lens 110, an opaque housing 120, an internal light engine 140, a first mounting bracket 150 a peripheral gasket (or seal) 160, a second bracket 170 and a fastener 180. The first and second brackets 150, 170 and the fastener 180 may be collectively used to secure the module 100 within an aperture or recess formed in the support member 50. The support member 50 may be be configured as an elongated metal extrusion or a flexible extrusion formed from plastic, such as vinyl, or another polymer. In one embodiment, the lens 110 and/or the housing 120 are injection molded from a polymer, such as a synthetic plastic. The modules 100 may have a low overall height that enables them to be mounted in a low-profile configuration at various locations along the support member 50. One preferred embodiment of the module 100 has an overall height of less than 0.5 inch, preferably less than 0.35 inch, and most preferably less than 0.275. The low overall height of the module 100 is an essential design factor because it allows the system 10 to have a low-profile configuration and provides a reduced form factor that minimizes the space needed for the system 10, which increases the usable volume and capacity of the cooler in which the system 10 is installed.

Figure 7:
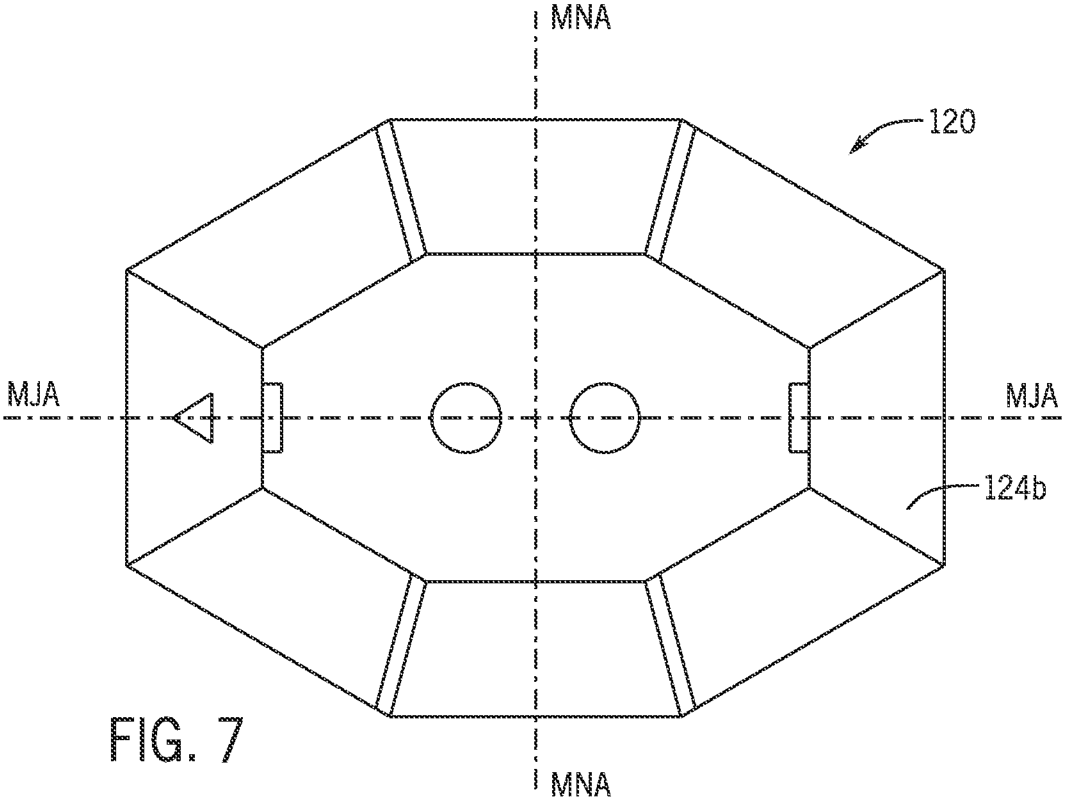
FIG. 7 is a top plan view of the housing of the LED lighting module of FIG. 1.
Figure 8:
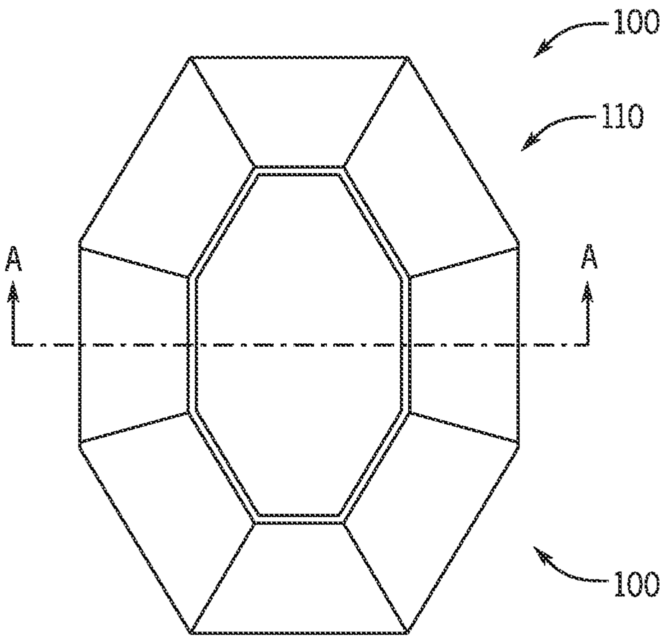
FIG. 8; is a top plan view of the LED lighting module of FIG. 1.

As shown in FIGS. 4-7, the housing 120 has a multi-contour configuration provided by a peripheral wall arrangement 122, an intermediate wall arrangement 124 extending upward from the peripheral wall arrangement 122, and a top wall 126. These walls interact to provide a first set of apertures **128*a* arranged along a first side 120*a* of the housing 120 and a second set of apertures 128*b* arranged along a second side 120*b* of the housing 120. As discussed below, the first and second set of apertures 128*a*, 128*b* are configured to allow light generated by the light engine 140 to pass through the housing 120. The intermediate wall arrangement 124 comprises minor intermediate walls 124*a* and major intermediate walls 124*b*, wherein the major intermediate walls 124*b* are located at opposed ends of the housing 120. A vertex 125 is defined where the intermediate walls 124 meet the upper edge of the peripheral wall 122. Referring to FIG. 7 (in which the lens 110 is omitted), the major axis MJA extends longitudinally through the major intermediate walls 124. The minor intermediate walls 124***a* are located along the side portions of the housing 120 and define the apertures 128*a*, 128*b*, wherein a minor axis MNA extends laterally through one of each of the first and second sets of apertures 128*a*, 128*b*. Referring to FIG. 1, which shows six modules 100 of the system 10 disposed on the support member 50 in a vertical configuration, the major axis MJA is oriented along a longitudinal or vertical axis of the support member 50 and the minor axis MNA is oriented substantially perpendicular to the longitudinal axis of the support member 50.

The housing 120 also includes an arrangement of reflecting surfaces 130 extending inward from the peripheral wall arrangement 122 to a base wall 132 that extends downward from a lower surface wall arrangement 133. The arrangement of the base wall 132 may define a lower, internal periphery of the housing 120 that is within the peripheral wall arrangement 122. The base wall 132 has opposed ends wherein each end may include a securing element 135 that engages and/or secures the light engine 140, mounting bracket 150 or both using a snap-fit assembly. The securing elements 135 and snap-fit assembly may provide enhanced heat dissipation properties during module operation, and may also facilitate module 100 and support member 50 mounting. Due to its multi-contour configuration, the housing 120 features an internal cavity or receiver 134 that receives the light engine 140 when the module 100 is assembled. The receiver 134 is bounded by the base wall 132 and the top wall 126.

A first set of reflecting surfaces 130*a* are associated with the first set of apertures 128*a*, and a second set of reflecting surfaces 130*b* are associated with the second set of apertures 128*b*. Referring to the cross-sectional view of FIG. 9, the reflecting surfaces 130 may be sloped or angled downward as the reflecting surfaces 130 extend inward from the lower peripheral wall arrangement 122 to the base wall 132. In other words, the reflecting surfaces 130 define an orientation angle θ with the mounting surface 52 of the support member 50. Depending upon the design parameters of the module 100 and the mounting surface 52, the orientation angle θ may vary between 0 and 90 degrees. To enhance reflection properties, the reflecting surfaces 130 can be coated with a metallization layer. The external lens 110 is cooperatively dimensioned with the housing 120 to include a corresponding multi-contour configuration. The lens 110 also includes at least one projection 112 that is received by an opening 136 in the top housing wall 126 and an opening 144*f* in the light engine 140 to facilitate securement of these components. In one embodiment, the projection 112 is heat-treated near the rear surface of the light engine 140 to join and secure the lens 110, housing 120, and light engine 140 together. The lens 110 can be configured to cover at least walls 124, 126 and not obscure the apertures 128, 128*a*, 128*b*.

Figure 3A:
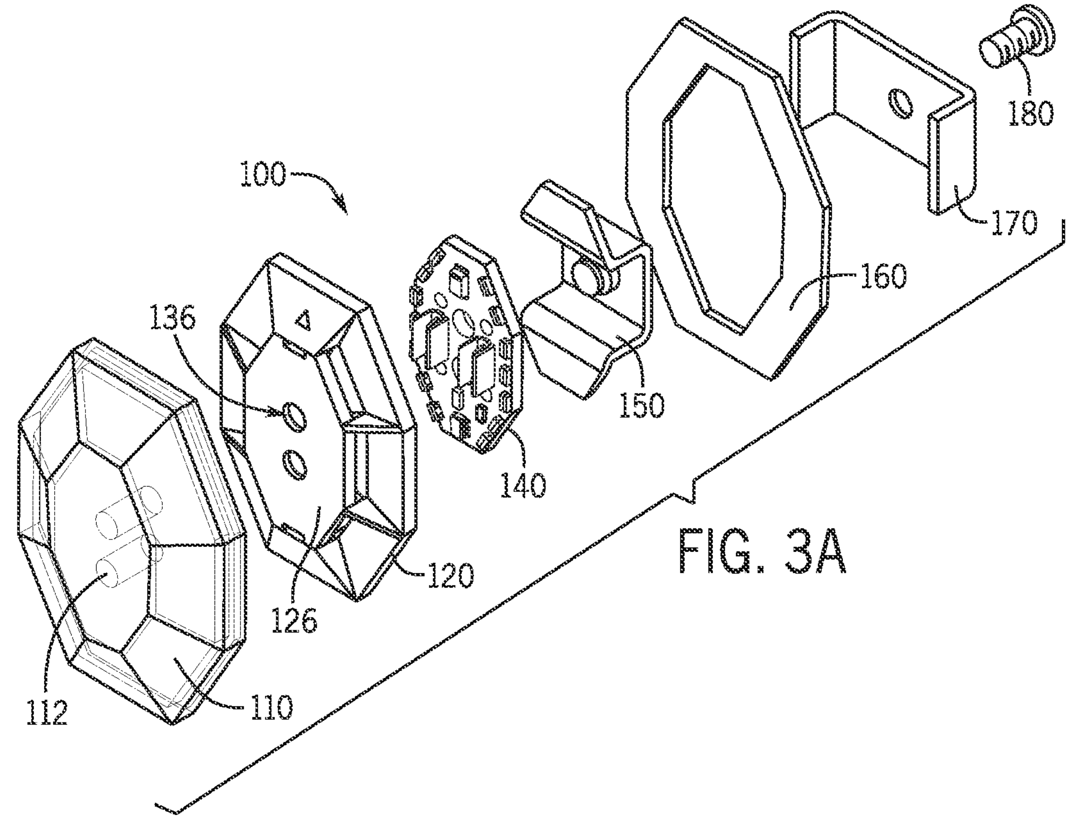
FIG. 3A is an exploded perspective view of the LED lighting module of FIG. 1.
Figure 3B:
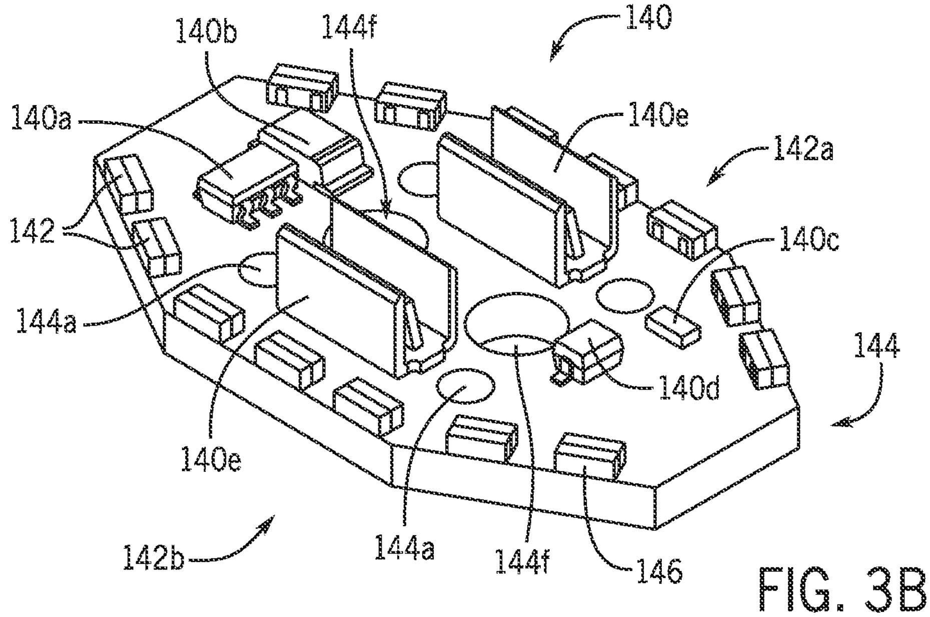
FIG. 3B is a top perspective view of a light engine of the LED lighting module of FIG. 1.
Figure 4:
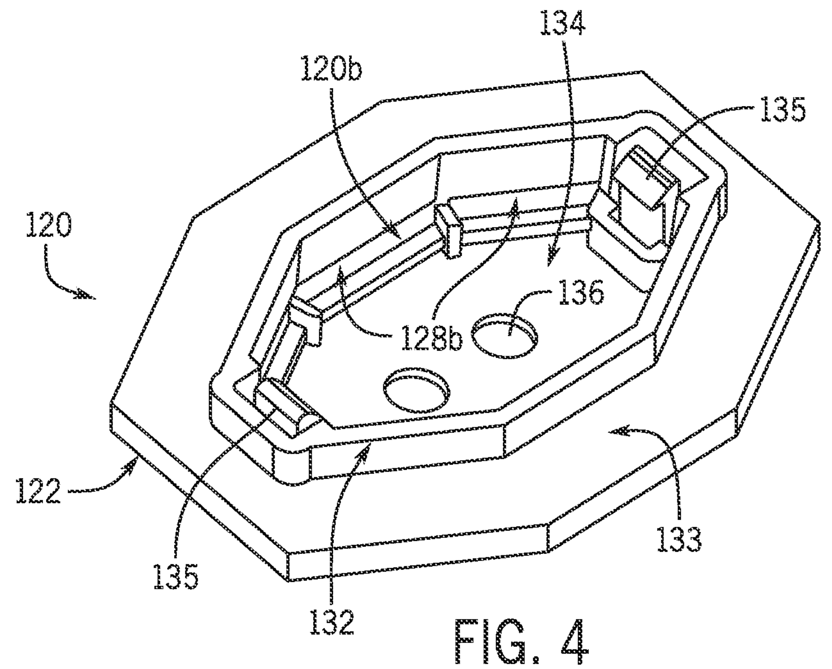
FIG. 4 is a bottom perspective view of a housing of the LED lighting module of FIG. 1.
Figure 5:
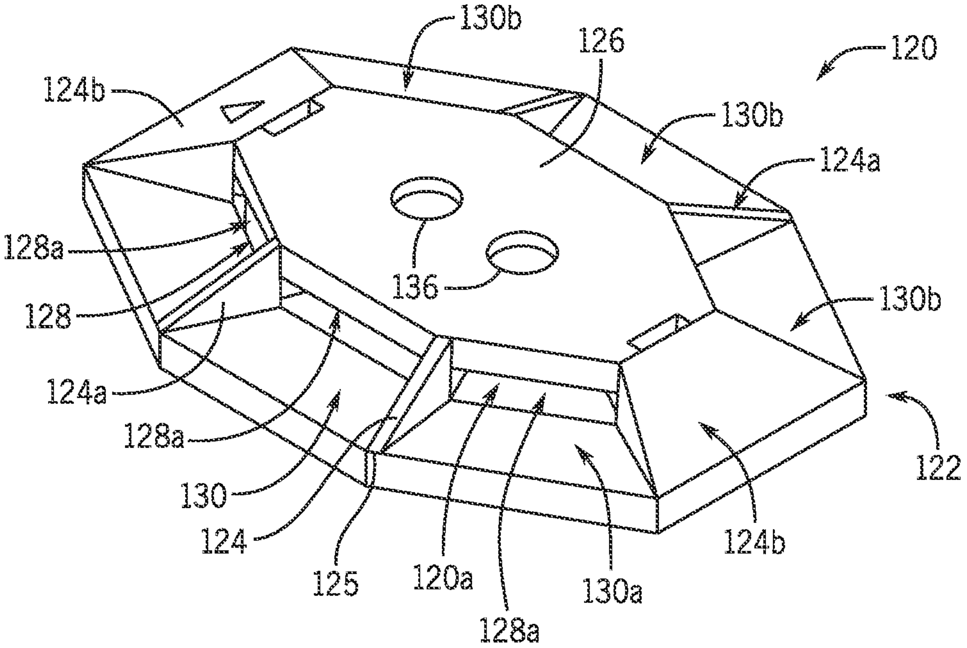
FIG. 5 is a top perspective view of the housing of the LED lighting module of FIG. 1.
Figure 6:
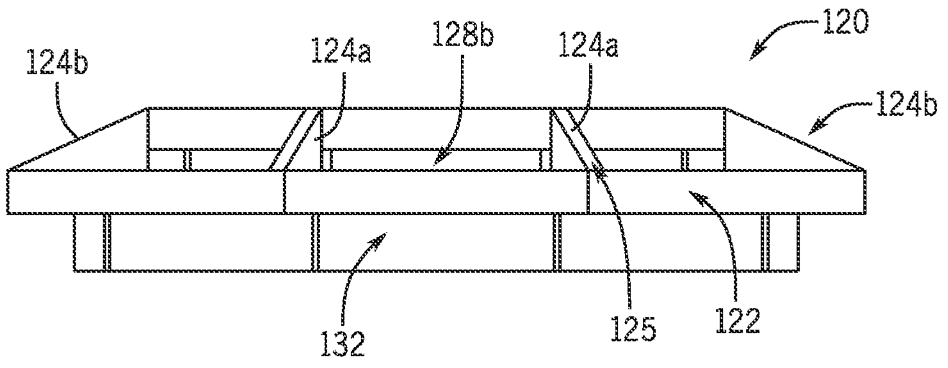
FIG. 6 is a side perspective view of the housing of the LED lighting module of FIG. 1.

As shown in FIG. 3B, the light engine 140 includes a first set of light emitting diodes (LEDs) 142*a* and a second set of LEDs 142*b*, both mechanically and electrically connected to a printed circuit board (PCB) 144. The light engine 140 may also include other components to maximize operating performance of the module 100, such as a linear current regulator 140*a*, protective diode 140*b*, ballast resistor 140*c*, transient voltage suppressor 140*d* and insulation displacement connectors 140*e*. Referring to FIG. 3B, each connector 140*e* may be positioned adjacent to a pair of apertures 144*a*, wherein the aperture 144*a* may receive an extent of a lead that interconnects modules 100 and the power supply. Thus, the lead may extend through two apertures 144*a* and the connector 140*e* to supply power to each set of LEDs 142*a*, 142*b*. The PCB 144 also may include at least one opening 144*f*, preferably positioned in a central region of the PCB 144 that receives an extent of the projection 112 of the lens 110.

The LEDs 142 are of the side-emitting variety designed to emit light only 180 degrees along an emitting surface 146, which is oriented perpendicular to the PCB 144. The side-emitting LEDs 142 may be arranged along the periphery of the PCB 144, which preferably has an octagonal configuration, and wherein the LEDs 142 may be preferably arranged along six of the eight sides of the PCB 144. The PCB 144 may have an aluminum substrate and a configuration that allows the PCB 144 to fit within the receiver 134. In one embodiment, each of the first and second sets of LEDs 142*a*, 142*b* includes 7 distinct LEDs, wherein the middle group of each set includes three LEDs 142 and the two outer groups of each set include two LEDs 142. Due to an octagonal configuration of the PCB 144, the middle group of three LEDs 142 (from the first and second sets) are arranged opposite each other, and the outer groups of two LEDs 142 (from the first and second sets) may also be oppositely arranged. Each of the six LED groups is associated with a specific aperture 128 formed in the housing 120. As such, the two middle groups of LEDs 142 are associated with the middle apertures 128 and the four outer groups of LEDs 142 are associated with the outer apertures 128.

Figure 9:
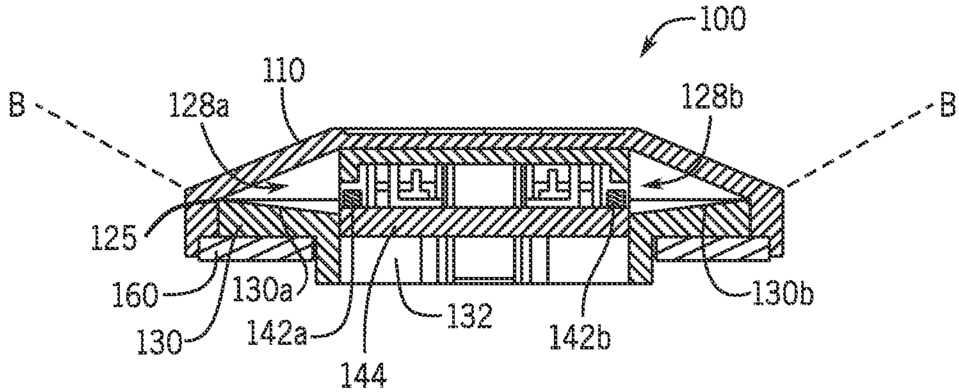
FIG. 9 is a cross-section view of the LED lighting module taken along line A-A of FIG. 8, showing exemplary light paths extending through the module during operation.

Referring to the cross-section of the module 100 in FIG. 9, an upper surface of the PCB 144 and a mid-height of the LEDs 142 are positioned above the inner edge 130*a* of the reflector 130. However, the upper surface of the PCB 144 and the mid-height of the LEDs 142 are positioned below the outer edge 130*b* of the reflector 130. In other words, the outer reflector edge 130*b* is located above the upper surface of the PCB 144 and the mid-height of the LEDs 142. These positional relationships of the housing 120 and the light engine 140 can increase the maximum operating performance of the module 100, including light generation and management with respect to the light provided within the cooler to illuminate objects therein.

When the system 10 is installed with a central support member 50, which is located at an intermediate region of the cooler and not at one end of the cooler, the modules 100 may be configured with both the first and second sets of LEDs 142*a*, 142*b*. However, when the system 10 is installed within a support member 50 located at an end of the cooler, or when the module 100 is installed at an end of a support member 50, the module 100 may be configured with only a single set of LEDs 142. Further, such a single set of LEDs 142 may populate only one side 120*a*, 120*b* of the module 100. Again referring to the cross-section of FIG. 9, the lower portions of the lens 110 and the housing 120 may define a peripheral gap configured to receive the gasket 160 to seal the module 100 against support member 50. The gasket 160 is intended to provide thermal and vibrational insulation, as well as sealing regarding moisture and light.

Figure 2:
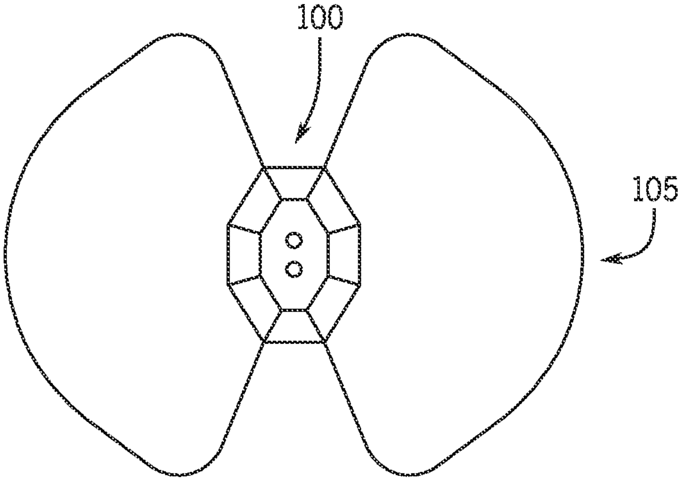
FIG. 2 is a top view of an LED lighting module of FIG. 1, showing an exemplary distribution pattern of light emitted by the module during operation.

FIG. 2 is a top view of the module 100 showing, in two dimensions, an exemplary light distribution pattern 105 emitted by the light engine 140 through the module 100. Referring to the cross-section of FIG. 9, the side-emitting LEDs 142 may emit light only 180 degrees along the LED emitting surface 146, wherein that surface is substantially perpendicular to an external edge of the PCB 144. The modules 100 may also emit light substantially along a plane of the mounting surface 52 while limiting light emitted along a plane perpendicular to the plane of the mounting surface 52. As the housing 120, including the top wall 126, is preferably opaque, stray light generated by the side-emitting LEDs 142 may be prevented from passing through the housing 120. The strongest or maximum intensity beam of emitted light from the LED 142 is aligned with the mid-height of the LED 142 and is shown by the reference beam B. In the installed position, the maximum intensity beam B is oriented substantially parallel to the support surface 52 of the elongated support member 50 shown in FIG. 1. The maximum intensity beam B is also oriented substantially parallel to the front face of the cooler and the cooler doors. The maximum intensity beam B is reflected by the reflecting surface 130 through the apertures 128 and lens 110 into the cooler. Preferably, the point of reflection on the surface 130 is below the vertex 125, which is where the intermediate wall 124 meets the upper edge of the peripheral wall 122. The maximum intensity beam B that is generated by the middle group of LEDs 142 within each of the first and second set of LEDs 142*a,b* is oriented substantially perpendicular to the major axis MJA and substantially parallel to the minor axis MNA of the module 100. When the system 10 is installed with the elongated support member 50 oriented vertically within the cooler, the maximum intensity beam B that is generated by the middle group of LEDs 142 is oriented substantially perpendicular to a vertical or major axis of the support member 50, and substantially parallel to a horizontal or minor axis of the support member 50. Due to the angular configuration of the PCB 144, the outer groups of LEDs 142 are oriented at an angle to both axes MJA, MNA and the maximum intensity beam B generated by the LEDs 142 in those groups may be angularly oriented to both the major axis MJA and the minor axis MNA of the module 100.

The side-emitting LEDs 142 also emit beams of light below the maximum intensity beam B wherein these lower light beams are reflected by the reflecting surface 130 through the aperture 128 and lens 110 into the cooler. Beams of light emitted by the LED 142 above the maximum intensity beam B may pass through the aperture 128 and lens 110 into the cooler without being reflected by the reflecting surface 130. Maximizing the upper beams of light that pass through the apertures 128 without reflection may improve operating performance of the module 100 because those beams have a greater intensity because reflection generally reduces beam intensity. In this manner, the module 100, and the shape, size and arrangement of housing 120, internal light engine 140 and external lens 110 features, are designed with a low-profile configuration to maximize the amount of light generated by the light engine 140 for transmission through the module 100 and into the cooler while minimizing both the area of the angled reflecting surface 130 and the power consumed by the light engine 140. These structural and performance attributes eliminate or reduce glare observed by people walking along a store aisle having a cooler(s) and then accessing the cooler or the items displayed therein. As the modules 100 operate efficiently, from both power consumption and light usage standpoints, the system 10 can be precisely configured for use with the support member 50. This allows the owner or operator of the cooler to accurately determine the number and density of modules 100 to be installed with the support members 50 of the cooler and thereby maximize the efficiency of the system 10 and minimize the material and operating costs of the system 10 and the cooler. In this manner, during operation of the LED lighting array system 10, a first portion of light generated by the side-emitting LEDs 142 is discharged through the apertures 128 and the lens 110 into the cooler to illuminate the contents and interior of the cooler, and a second portion of light generated by the side-emitting LEDs 142 is redirected by the reflecting surface 130 through said apertures 128 and the lens 110 into the cooler to illuminate the contents and interior of the cooler.

Figure 10:
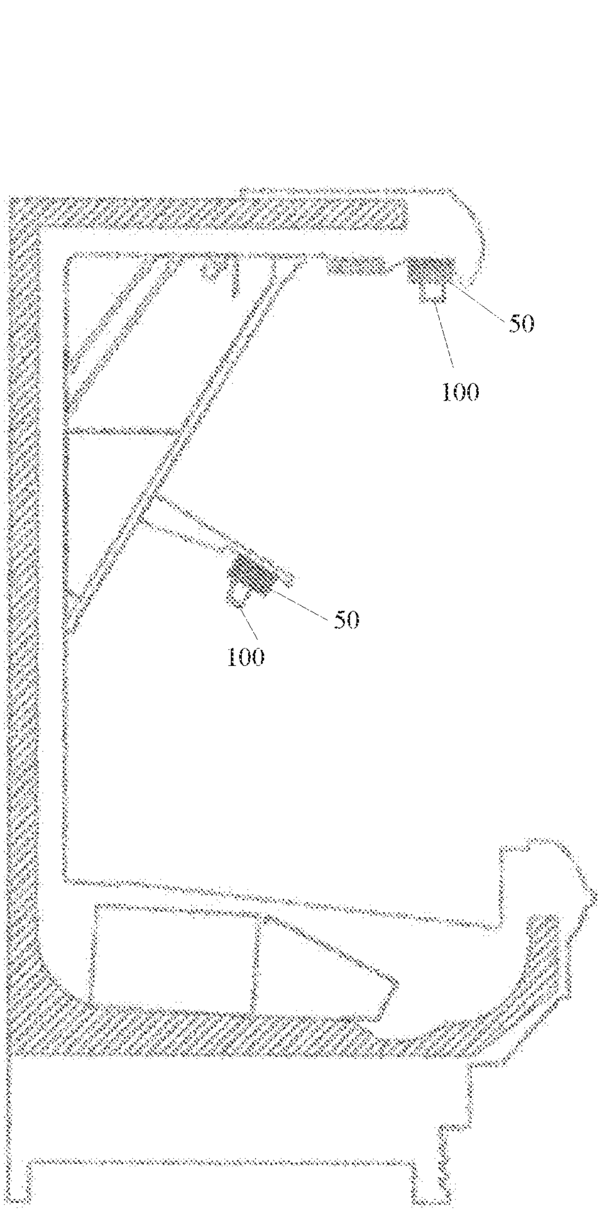
FIG. 10 is a cross-section side view of a cooler with the LED lighting module of FIG. 1.

As the amount of light that is generated by the light engine 140 and then passes through the module 100 is a function of its internal configuration, the light engine 140 and the reflecting surfaces 130 can be adjusted while retaining the system's 10 low-profile configuration, including the dimensions of the lens 110. For example, the thickness of the PCB 144 can be reduced, which changes the position of the side-emitting LED 142 and the resulting maximum intensity beam B relative to the reflecting surface 130, thus increasing the quantity of light directly discharged through the housing 120 without reflection into the cooler. In another example, the thickness of the PCB 144 may be increased, which elevates the side-emitting LED 142 and the resulting maximum intensity beam B relative to the reflecting surface 130, thus increasing the quantity of light reflected by the reflection surfaces 130 before being discharged through the apertures 128 of the housing 120 and into the cooler. In another example, the dimensions of the reflection surface 130 (e.g., slope or height) may be adjusted, which changes how the maximum intensity beam B and lower light beams are reflected through the apertures 128 into the cooler. Accordingly, housings 120 having different configurations of the reflection surfaces 130 can be used with the same light engine 140 (and lens 110) to yield different performance characteristics for the module 100. As a result, the utility and flexibility of the module 100, and thereby the system 10, are significantly increased. For example, a cooler 200 may have an arrangement of support members 50, each member 50 includes one or more modules 100, as shown in FIG. 10.

While the present disclosure has been described in terms of exemplary embodiments, those skilled in the art will recognize that the present disclosure can be practiced with modifications in the spirit and scope of the appended claims. These examples given above are merely illustrative and are not meant to be an exhaustive list of all possible designs, embodiments, applications or modifications of the present disclosure.

A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A lighting array system featuring light emitting diodes (LEDs) for use within a refrigerated cooler to illuminate products residing within the refrigerated cooler, the lighting array system comprising:

a first module comprising:

a first LED, a first reflecting surface, and a first transparent external lens configured to substantially overlie the first LED and the first reflecting surface, the first external lens having:

a first external wall having a first external surface, a second external wall having a second external surface, and an intermediate wall that extends between and connects the first and second external walls, wherein the intermediate wall has an outer surface, and wherein the entirety of the outer surface is not positioned perpendicular to the first external surface of the first external wall or the second external surface of the second external wall; and wherein during operation of the lighting array system, a first portion of light generated by said first LED is discharged in a first direction through the first external lens, and a second portion of light generated by said first LED is redirected by the first reflecting surface through the first transparent external lens.

2. The lighting array system of claim 1, further comprising a second module comprising:

a second LED, a second reflecting surface, a second transparent external lens configured to substantially overlie the second LED and the second reflecting surface, the second external lens having:

a first external wall having a first external surface, a second external wall having a second external surface, and an intermediate wall that extends between and connects the first and second external walls, wherein the intermediate wall has an outer surface, and wherein the entirety of said outer surface is not positioned perpendicular to the first external surface of the first external wall of the second external lens or the second external surface of the second external wall of the second external lens; and wherein during operation of the lighting array system, a first portion of light generated by said second LED is discharged in a second direction through the second transparent external lens, and wherein the second direction is substantially opposite of the first direction.

3. The lighting array system of claim 1, wherein the first module is coupled to a primary wall of a support member of the refrigerated cooler; and wherein the first reflecting surface is oriented at an upward angle relative to the primary wall of the support member.

4. The lighting array system of claim 1, wherein the first module is coupled to a primary wall of a support member of the refrigerated cooler; and wherein at least a lower extent of the first external wall is positioned substantially perpendicular to the primary wall of the support member.

5. The lighting array system of claim 3, wherein an extent of a planar surface of the primary wall of the support member that extends between the first and second external lens is exposed to an inner extent of the refrigerated cooler.

6. The lighting array system of claim 1, wherein the outer surface of the intermediate wall includes a first intermediate surface portion that is angled with respect to a second intermediate surface portion.

7. A refrigerated cooler that displays products residing within the refrigerated cooler, the refrigerated cooler comprising:

a lighting array system installed within the refrigerated cooler and including:

a support member configured to be coupled to an internal structure within the refrigerated cooler, said support member including a first aperture and a second aperture that are formed through the support member and that are spaced an appreciable distance apart along a length of the support member;

a first module received within the first aperture and having:

a first LED, and a first external lens configured to overlie the first LED and a first reflecting surface, the first external lens having: a first external wall having a first external surface, a second external wall having a second external surface, and an intermediate wall that extends between and connects the first and second external walls, wherein the intermediate wall has an outer surface, and wherein the entirety of the outer surface is not positioned perpendicular to the first external surface or the second external surface;

a second module received within the second aperture and having:

a second LED, and a second external lens configured to overlie the second LED;

wherein an intermediate extent of the support member is defined along said length of the support member between the first and second modules, said intermediate extent being exposed without an overlying lens to an inner portion of the refrigerated cooler.

8. The refrigerated cooler of claim 7, wherein the lighting array system lacks an external lens that overlies both the first LED of the first module and the second LED of the second module.

9. The refrigerated cooler of claim 7, wherein an extent of a first external surface of the first external lens of the first module is positioned substantially parallel to an extent of a first external surface of the second external lens of the second module.

10. The refrigerated cooler of claim 7, wherein a first portion of light generated by the first LED of the first module is discharged in a first direction into the refrigerated cooler and a first portion of light generated by the second LED of the second module is discharged in a second direction into the refrigerated cooler, wherein the first and second directions are opposed to one another.

11. The refrigerated cooler of claim 7, wherein a maximum intensity of light generated from the first LED is oriented substantially parallel with a front extent of the refrigerated cooler.

12. The refrigerated cooler of claim 10, wherein a second portion of light generated by the first LED of the first module is redirected by the reflecting surface of the first module through the first external lens of the first module into the refrigerated cooler and a second portion of light generated by the second LED of the second module is redirected by a reflecting surface of the second module through the second external lens of the second module into the refrigerated cooler.

13. A lighting array system featuring light emitting diodes (LEDs) for use within a refrigerated cooler, the lighting array system comprising:

a planar support member;

a first module positioned within a first aperture formed through said support member, the first module comprising:

a first LED, a first external lens configured to overlie the first LED; and wherein during operation of the lighting array system, a first portion of light generated by said first LED is discharged through the first external lens; and wherein a maximum intensity of the light generated from the first LED is oriented substantially parallel with a front extent of the refrigerated cooler.

14. The lighting array system of claim 13, wherein the lighting array system further comprises a second module configured to be positioned within a second aperture formed through said support member an appreciable distance apart from the first module, the first and second apertures arranged along a length of the support member, the second module comprising a second LED and a second external lens configured to substantially overlie an extent of said second LED; and wherein the lighting array system lacks a lens that overlies both of the first and second modules.

15. The lighting array system of claim 13, wherein the first portion of light generated by said first LED is discharged in a first direction, and wherein the lighting array system further comprises a second module with a second LED that is configured to discharge light in a second direction that is opposite of the first direction.

16. The lighting array system of claim 13, wherein the first external lens of the first module has a height that is less than 0.5 inches.

17. The lighting array system of claim 13, wherein a first surface of the first external lens is substantially parallel with a second surface of the first external lens.

18. The lighting array system of claim 13, wherein the planar support member includes: (i) a first edge that is substantially parallel with a first surface of the first module, and (ii) a second edge that is substantially parallel with a second surface of the first module.

19. The lighting array system of claim 13, wherein the planar support member is integral to a support frame of the cooler.

20. The lighting array system of claim 14, wherein an intermediate extent of the planar support member is defined along the length of the planar support member between the first and second modules, said intermediate extent being exposed without an overlying lens to an inner portion of the refrigerated cooler.

* * * * *